United States Patent [19]
Waldman

[11] Patent Number: 5,311,175
[45] Date of Patent: May 10, 1994

[54] METHOD AND APPARATUS FOR PRE-IDENTIFICATION OF KEYS AND SWITCHES

[76] Inventor: Herbert Waldman, 1739 52nd St., Brooklyn, N.Y. 11204

[21] Appl. No.: 607,715
[22] Filed: Nov. 1, 1990
[51] Int. Cl.$^5$ .................................. H03M 11/10
[52] U.S. Cl. ............................. 341/34; 341/22; 341/23; 341/27
[58] Field of Search ............. 341/21, 23, 27, 22, 341/24, 34; 200/5 A; 364/709.06, 709.12, 709.14, 709.15; 400/87, 476, 477, 479, 481, 485, 491.3; 178/17 C; 379/368, 52; 340/706, 711

[56] References Cited

U.S. PATENT DOCUMENTS

| D. 280,099 | 8/1985 | Topp | 379/52 X |
|---|---|---|---|
| 4,028,695 | 6/1977 | Saich | 341/23 |
| 4,202,038 | 5/1980 | Petersson | 341/23 X |
| 4,700,377 | 10/1987 | Yasuda et al. | 341/23 X |

FOREIGN PATENT DOCUMENTS

| 2009047 | 6/1979 | United Kingdom | 400/491.3 |
|---|---|---|---|
| 2016184 | 9/1979 | United Kingdom | 364/709 |

Primary Examiner—Donald J. Yusko
Assistant Examiner—Michael Horabik

[57] ABSTRACT

A method and apparatus for keypads, for conveying audible, visual or tactile information to a user regarding the identity, function, proper usage or potential utility of a given key or group of keys. The information being invoked by the user through superficial or proximal manipulation of the given key without having pressed or manipulated it in a way that would invoke its normal function. The primary concern of the system is as an informational adjunct to a more traditional keypad.

18 Claims, 8 Drawing Sheets

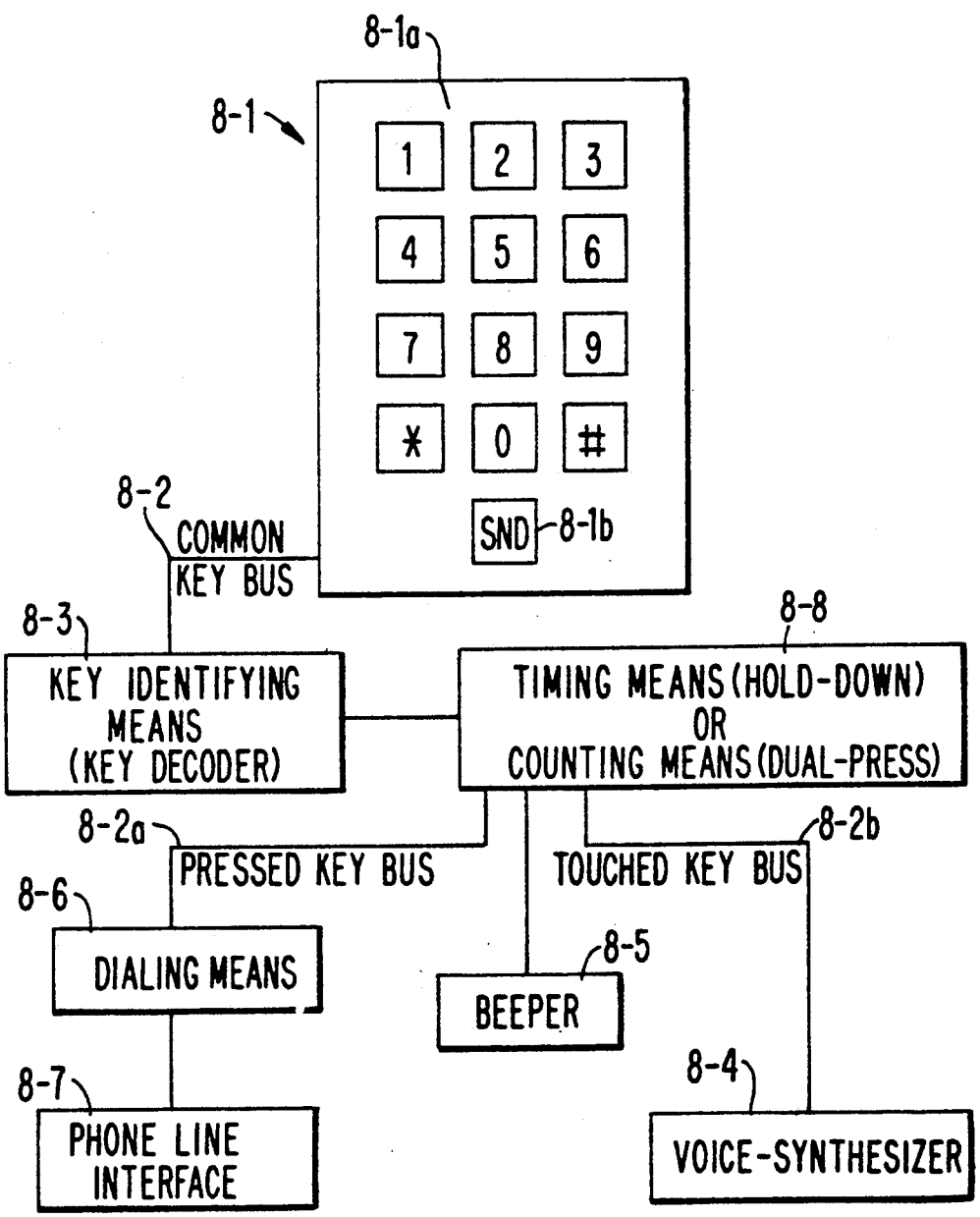

METHOD AND APPARATUS FOR PRE-IDENTIFICATION OF KEYS AND SWITCHES

The subject matter of this application is related to the following disclosure documents:

1. A Method for Proximity-Activated or Superficial-Contact-Activated Identification of Keys on a Pressure-Activated Keypad, Ser. No. 264,836, Sep. 7, 1990

2. A Method for Proximity-Activated or Superficial-Contact-Activated Identification of Keys on a Pressure-Activated Telephone Dialer or Keypad Particularly Adapted to Cellular and Mobile Telephones, Ser. No. 265,634, Sep. 7, 1990.

BACKGROUND OF THE INVENTION

This invention relates to key and pushbutton apparatus and a method of conveying identification, instruction, or description information about such keys or buttons, primarily when they are manipulated superficially by the user (touched) as opposed to being used in their normal fashion (pressed; i.e., having their normal functions invoked by the user). The preferred apparatus of the invention is embodied to serve this need most concisely by combining the informational key means above the ordinary functional key means in a vertical "layered" format rather than a horizontal "planar" format, such that it can be accessed informationally by a user (e.g., for identification of or instruction about the underlying ordinary function key) without actuating the (possibly erroneous or unknown) ordinary function. With audible informational means, this aspect the invention is particularly adaptable to numeric keypad/pushbutton systems with mixed functions such as modern telephone keypads, and especially suited to applications where visual distraction of the user is a problem, such as with cellular telephone keypads.

Over the past years great strides have been made in both voice-synthesis and keypad technology, and many present-day products and systems use one or both in some form. Many microprocessors and dedicated IC-circuits capable of voice-synthesis, keypad-handling, or both are available, as are many forms of matrix and pushbutton keypads utilizing both traditional (mechanical movement-and-contact) methods and more sophisticated electronic methods for non-mechanical detection of key usage. The latter include, among others, resistive and/or capacitive electrical systems using conductive or semiconductive keypad materials, low-pressure-contact matrix materials (a la LCD touch-screens), piezo-mechanical materials, as well as infra-red and other "touch-free" detection systems which detect proximity to a key rather than actual contact. Thus, as one will understand, a wide variety of such technologies is available to the present-day systems-designer for implementing both voice-synthesis and keys, and the prior art is cognizant of many techniques and applications thereof. Numerous products are also available which marry the two technologies, typically by emitting a synthesized voice message regarding the pressed key, given after a key is pressed and/or its function executes.

The prior art does not, however, disclose or anticipate the marriage of the two technologies in a form that allows a user to obtain information or instruction about a key prior to making normal use of the key by manipulating it in a superficial or characteristic manner that does not activate its normal function. The state of current electronics switching and keypad catalogs aptly reveals this, as one can find only traditional rocker switches as a potential "off-the-shelf" embodiment of the switching needs of the invention. Even OFF-MOM-MOM mechanical pushbuttons, which are not unknown to the state of the art and could implement a system closer to the preferred embodiment than rockers, are semi-custom items not listed in short-form catalogs. No catalog hardware even approximating the preferred embodiment, which foresees a substantially zero-effort "touch-sensitive" key positioned above a substantially existent-effort "pressure-sensitive" key, is available even in semi-custom form.

It is understood, of course, that any technique which enables the user to obtain information or instruction about a key (or group of keys) before functional use of it would enhance the operation of complex keypad systems, and would particularly enhance the safe and accurate use of keypad systems (such as mobile telephones) wherein visual distraction of the user is unsafe or undesirable. There have been many articles written which describe the hazards imposed by dialing on a cellular system while manipulating an automobile, and it is obvious that any improvement or enhancement of the dialing procedure which will keep the driver's eyes on the road will be particularly advantageous and valuable. Likewise, such a device would be of immense value as a system for the handicapped, particularly the visually impaired for whom keypad use is literally a hit-or-miss affair. In both instances, the characteristic of giving identification information regarding a touched key before it is pressed and its function is executed would be of great value.

The apparatus and methods to be described enable information in a wide variety of forms to be passed to a user in a variety of ways prior to the pressing and functional invocation of a key.

The method and apparatus of the instant invention depend upon a two-level keypad system wherein a first (Touch) subsystem responds to an informational manipulation of a key and a second (Press) subsystem responds to a functional manipulation of the same key. This is accomplished most simply by vertically laminating a Touch-responsive keypad requiring little or no physical actuation pressure (such as a conductive-pad capacitive-discharge system) over the top of a traditional (mechanical throw-and-contact) Press-responsive system requiring significant actuation pressure. The former (Touch) system would then be linked to a voice-synthesizer or other information-giving means capable of decoding the Touch and passing appropriate information to the user regarding the underlying, functionally associated key.

It should be noted, however, that there are many alternative means by which the informational and keypad needs of the invention could be met. Some examples of the former are visual responses such as display messages giving help to the user regarding keypress function, or tactile feedback from the key itself for specialized identification purposes, while some examples of the latter are proximity-sensing systems rather than touch-sensing ones (e.g., infra-red), dual-throw mechanical keys wherein a moderate actuation-pressure results in the informational function while a harder pressure actuates a second throw resulting in the functional function, or even dual-press systems wherein keys are pressed once for informational use and a second time, perhaps within a given time-frame, to accomplish functional use. None of the above examples violate the spirit of the invention, which is to provide some sort of information regarding a given key or key-group to a user without invoking the normal functionality of that key or key-group. Many implementations that would accomplish this are possible.

As one can understand, the main object of the invention is to advantageously utilize the characteristics of the many voice-generation and keypad technologies available at the present time. Numerous examples of appropriate technology are readily available in independent forms well known to the state of the art, and they can be married in a wide variety of ways to accomplish the precepts of the invention.

OBJECTIVES OF THE INVENTION

According to the concepts described above, the functional objectives of the invention is simply to provide information about a key or group of keys to the user, conveniently through the use of the key itself but without invoking the normal function of the key (and possibly suffering the consequences of incorrect usage). The simplest way to visualize the invention conceptually is as two separate but related keys adjacent to one another, wherein one is marked "Key X Information" and the adjacent key is marked "Key X." The type of information passed to the user upon invocation of "Key X Information," or the way and means by which it is passed, are inconsequential and would vary from one implementation to another. The idea is simply that some useful information regarding what will happen when "Key X" is invoked will be passed. This is a clear but awkward implementation of the concept of the invention, but not of the invention itself, which encompasses the simpler and more elegant means of associating "Key X Information" with "Key X" by combining them into a single physical key, which when used in an otherwise normal manner (e.g., touched with a fingertip) but not invoked through pressure provides "Key X Information," and when invoked through pressure executes the function of "Key X."

SUMMARY OF THE INVENTION

In a keypad system having at least one first key for effecting an ordinary function or functions when actuated in a prescribed manner by a user (such as a physically-applied pressure), at least one of said keys also having a functionally associated second key means actuated in a different prescribed manner (such as a contact with substantially zero physically-applied pressure), the system also having a user-signaling means capable of producing an informational indication to uniquely identify the associated ordinary function key to the user or likewise describe one or more useful characteristics thereof; a method wherein upon the prescribed actuation of said second key means, the system will present the associated information to the user without said first key means necessarily having been actuated or its ordinary function invoked. The apparatus of the invention accomplishes this most strongly by a vertical layering of the first and second means wherein they appear to the user as a single key, but with the second means requiring a lesser actuation effort than the first, allowing it to function informationally without actuating the second means located beneath it. The primary concern of the system of the instant invention is thus as an informational adjunct to a more traditional keypad, and the primary concern of the apparatus of the invention is to serve this need concisely by vertically associating access to both the information and ordinary function means.

BRIEF DESCRIPTION OF THE FIGURES

FIG. 8 is an example representation of a store & forward telephone keypad & dialer with voice-synthesis key identification, capable of utilizing either a Dual-Press Protocol or a Hold-Down protocol for Touch detection with a single key bus.

STATE OF THE ART COMPONENTS

Figure 1:
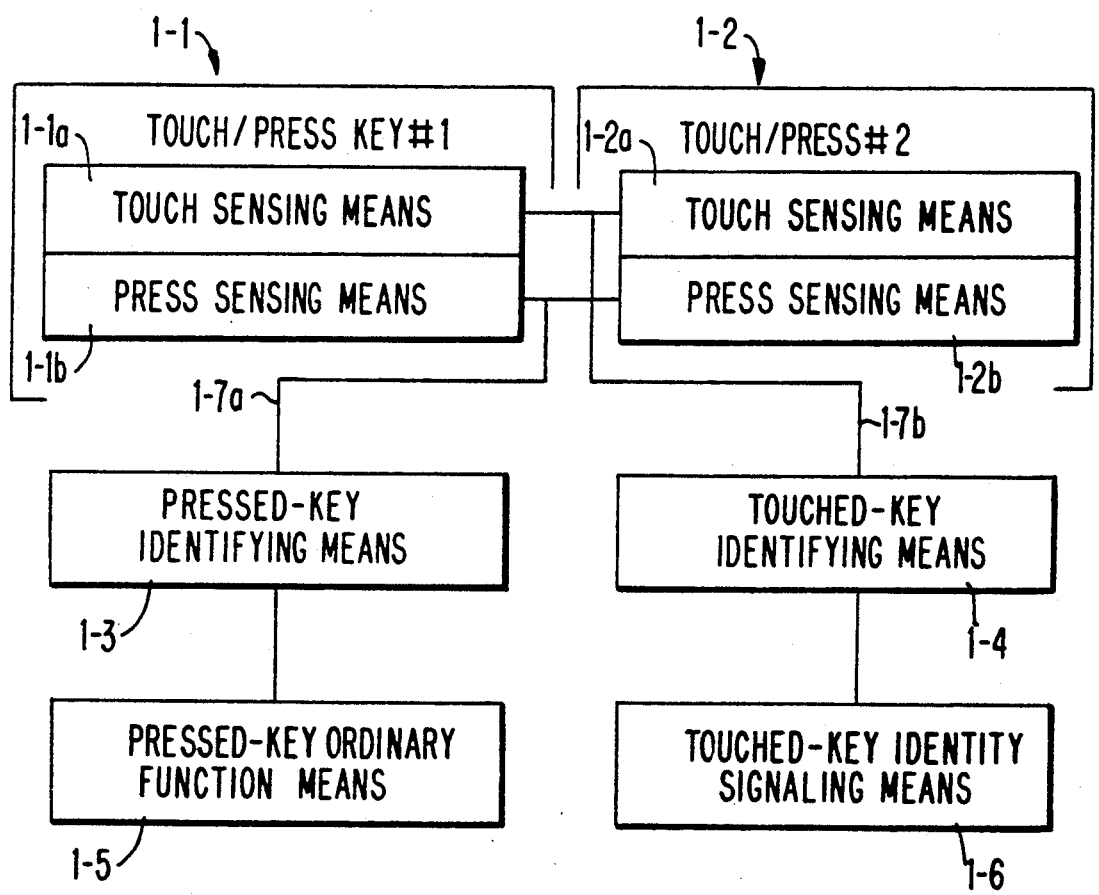
FIG. 1 is a block representation of two keys incorporating Touch and Press functions.

All the elements and modules of the system of the invention are well known individually in the state of the art, and are therefore shown in block form without delving into the details of their design and construction. This approach is used in order to facilitate the clarity and simplicity of the specification and to avoid undue cluttering of the drawings. Power supplies and external line or data interfaces (such as phone-line connections) are similarly not shown, except in block form where necessary.

DEFINITION OF TERMS USED

Key/Key means:

Any detection or switching means capable of signaling the occurrence of a specific mechanical user action with regard to itself, typically that of the proximity and/or contact and/or mechanical pressure of a user's finger.

Keypad:

Any arrangement of one or more keys on a substantially planar surface.

Press Function/Ordinary Function/Traditional Function/Execution Function:

The specific function performed by a given device in response to a specific key without regard to the invention.

Press:

Any use of a key which would invoke the ordinary function of that key.

Touch Function/Informational Function:

The function performed by a given key with regard to a functionally associated key according to the invention.

Touch:

Any use of a key which would invoke and provide for the conveyance of information about a functionally associated key, without necessarily invoking the ordinary function of said associated key.

Touch Means:

Any key or key protocol functional with regard to the above definition of a Touch.

Touch Capable Key:

Any vertically associated combination of Key means wherein layers farther from the source causing the detection or switching require a succeedingly greater effort or proximity on the part of the source to result in detection or switching.

Functionally associated:

A relationship between two keys wherein a substantially different functions are performed by each with regard to a substantially complementary purpose, e.g., a key which performs a function, associated with a key which provides information regarding said function-performing key.

Horizontally associated:

A relationship between keys primarily across a substantially planar attachment surface.

Vertically associated:

A relationship between keys primarily perpendicular to a substantially planar attachment surface.

Physically associated:

A relationship between keys consisting of having no key(s) intervening geographically between them on a given axis.

Proximally associated:

A relationship between physically and functionally associated keys consisting of having particular adjacency, coloring, labelling, or other characteristic designed to imply functional association.

(True) Touch/Press:

A vertically associated pair or set of keys wherein a key(s) upward or uppermost with regard to the user performs a Touch function(s) and the key(s) downward or lowermost with regard to the user perform a Press function(s).

Satellite Key:

A horizontally associated key or key-throw physically and proximally associated with another specific Pressable key or key-throw, performing informational actions specific to that key.

Hold-Down Protocol/Press-and-Hold Protocol:

A protocol whereby a user depresses a key uninterrupted for a given interval (or longer) in order to signify an action different from that of a depression shorter than the interval. In order to insure a positive delayed-release action of such a key, such a protocol may involve a delayed (or second) audible tone, audible phrase, or other type of system-acknowledgement of the alternate key function.

Dual-Press Protocol/Dual-Actuation Protocol:

A protocol whereby a user presses a key a second time in succession to accomplish a result different from that of a single press.

Multi-Press Protocol/Multi-Actuation Protocol:

A protocol whereby a user presses a key a predefined number of times in succession to accomplish a result different from that of a single or other number of presses.

DETAILED DESCRIPTION OF THE FIGURES

FIG. 1 is a block diagram showing Touch and Press functions residing in each of two individual keys (assemblies 1-1 and 1-2), connected to common buses (1-7a for Pressed keys and 1-7b for Touched Keys) that connect to means identifying the Touch source key (1-4) and producing a signal (1-6) on a Touch and identifying the Press source key (1-3) on a Press and executing the function(s) appropriate to it. Note that in this (preferred) embodiment the Touch sensing means (1-1a and 1-2a), which respond to proximity or low or no finger pressure, are physically atop the Press sensing means, which respond to significant finger pressure. This, a Touch will respond in only a Touch detection, while a Press will result in both a Touch and a Press being detected. The circuitry in blocks 1-5 and 1-6 may handle this latter situation in any appropriate fashion, including aborting or altering the Touched key signal produced by 1-6.

Figure 2:
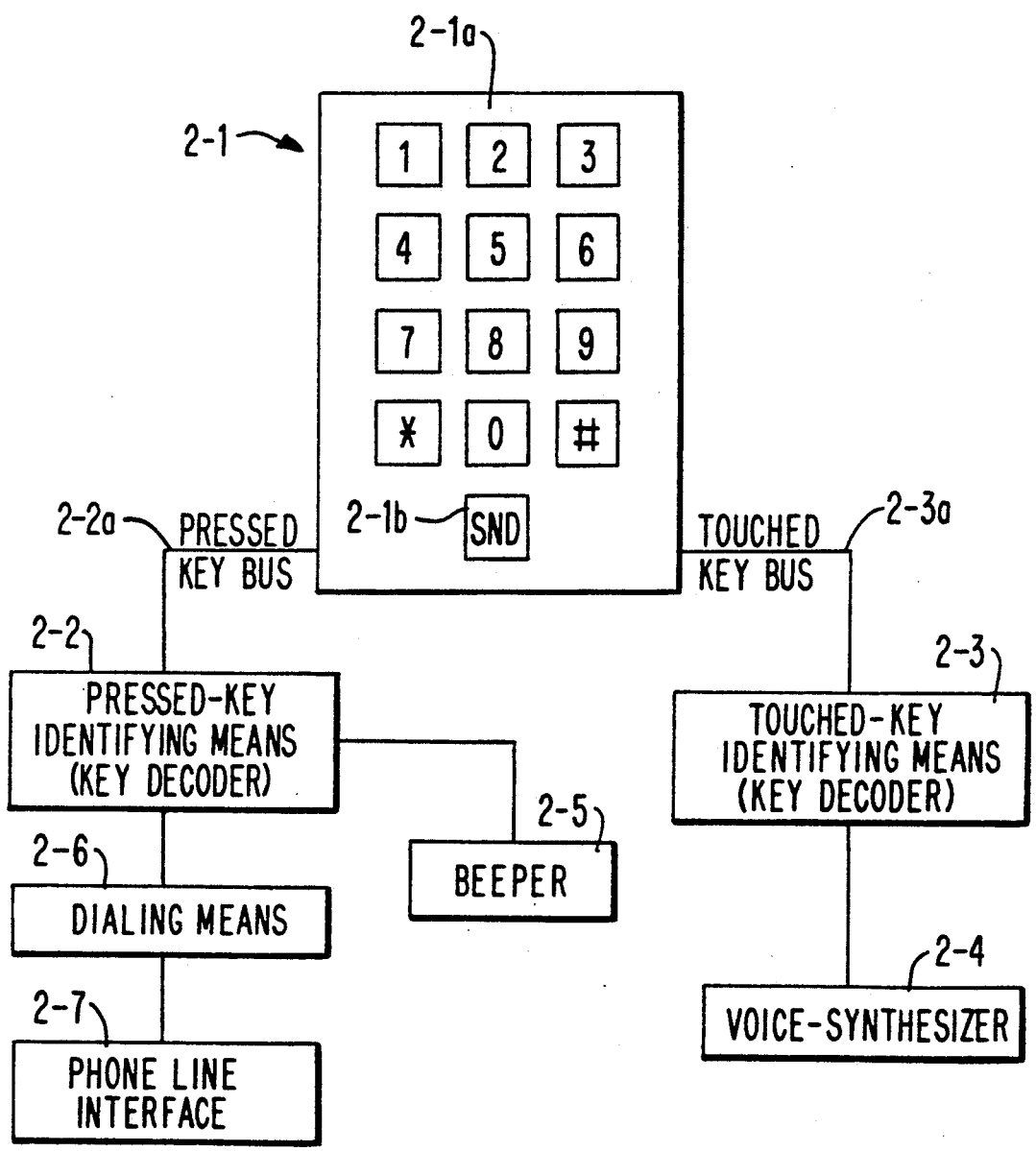
FIG. 2 is a block representation of a simplified store & forward telephone keypad utilizing Touch and Press functions.

FIG. 2 is an exemplary system showing a simplified telephone dialing keypad (2-1) using a "store & forward" method whereby pressed digit keys (2-1a) are buffered by a memory-equipped dialing means (2-6) or other memory circuit, then forwarded to the line-interface (2-7, including indirect interfaces such as a cellular RF-interface) by a SEND (SND, 2-1b) key. The illustrated system responds to a Touch (a la FIG. 1) by decoding it (2-3) off the Touched Key Bus (2-3a) and naming the Touched key audibly via the voice synthesizer (2-4), e.g., by speaking "one" when the top lefthand key is Touched, "star" if the bottom lefthand key is Touched, etc. It responds to a Press by executing the Touch functions above (since a Press implicitly causes a Touch), but also decoding the key as Pressed (2-2) off the Press Key Bus (2-2a) and thereafter buffering the appropriate digit for dialing (2-6) and audibly emitting an acknowledging beep (2-5). Upon decoding a SND (2-1b) Press, the system forwards the contents of the dialing means to the line interface (2-7). By confirming the identity of a Touched digit key before it is Pressed, a user can easily and consistently dial correct telephone numbers with no visual attention or input. Additionally, the system could be configured to identify the entire telephone number currently held in the dialing buffer on a SND Touch, thereby confirming the number before it is sent to the line interface by a SND Press. This latter function could also be applied to redial, memory, and other optional keys with complex functions based on previously-entered data, providing a good example of the kind of Functional and Objective Use information (described further elsewhere) that can be provided by the invention in addition to simple key-identification.

Figure 3A:
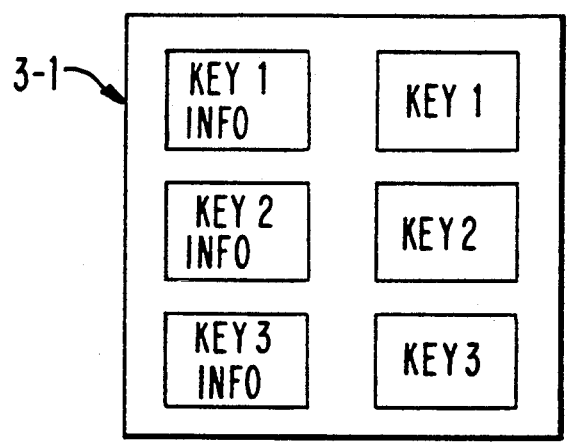
FIG. 3a is a plan view representation of a keypad employing separate informational keys.
Figure 3B:
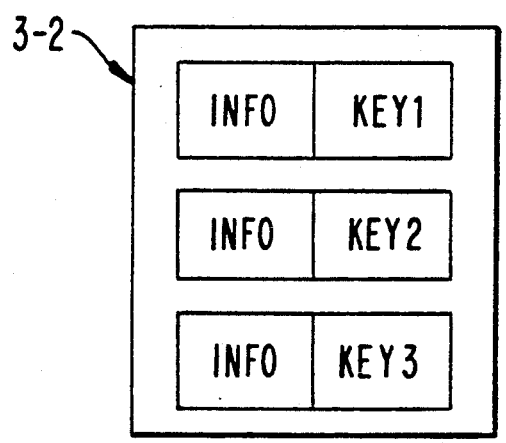
FIG. 3b is a plan view representation of a keypad employing Satelite information keys.
Figure 3C:
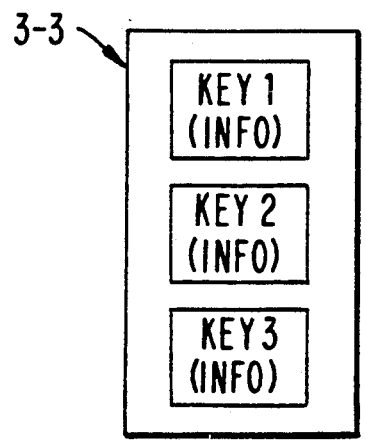
FIG. 3c is a plan view representation of a keypad employing true Touch/Press combined keys.

FIGS. 3a, 3b and 3c are a comparative plan view representation of three three-key keypads employing (respectively) separate informational keys (3-1), Satellite information keys (3-2), and true Touch/Press combined keys (3-3). Note that the separate key setup (3-1) requires a corresponding information key (marked "Info") for each function key, separately labelled as informational. This sort of system might be satisfactory for relaying functional or usage information, but has little utility for key-identification purposes, since the user is required to physically remove his finger from the information key and seek out the function key afterward. In contrast, although still separate, the Satellite key system (3-2) geographically associates the informational and functional keys more conveniently, and obviates some of the labelling requirements thereby. Note, however, that the user still has to move his finger (albeit slightly) to actuate the functional half of the pair, which makes such a system good but not foolproof for key-identification purposes, much as blind keying can be accomplished (albeit even less reliably) on a standard telephone keypad, whose digit keys always occur in a fixed geographic relationship to one another and can be remembered. Note also that to be useful for key pre-identification purposes, the system would require either the same basic treatment as the preferred embodiment, (i.e., the "Info" half of the pair having a zero or markedly lesser actuation pressure and the functional half having a non-zero or markedly greater actuation pressure), or a distinguishable tactile (e.g., a roughened surface) or directional (e.g., a double-throw rocker-switch pad with the information-giving throws consistently to one side) characteristic allowing the information key to be readily and "blindly" recognized by the user. Some such identifying characteristic must be supplied to make such a system useful for blind keying as opposed to a traditional keypad setup.

Figure 4:
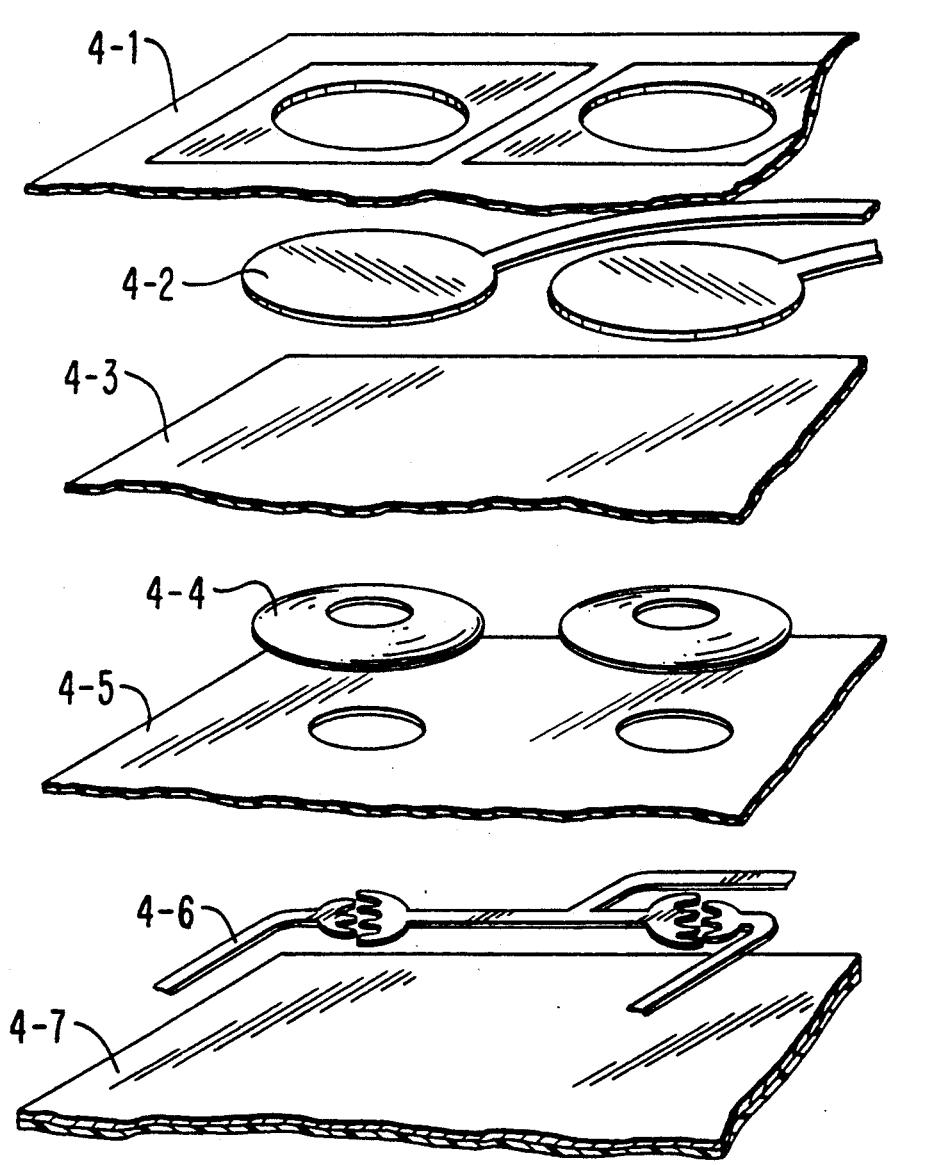
FIG. 4 is an exploded section view of a standard "tactile-membrane" laminated keypad section including exposed conductors for Touch use.

FIG. 4 is an exploded section view of a "tactile-membrane" laminated keypad such as is commonly used and well-known to the state of the art, but additionally including conductors (4-2) exposed through holes in the face laminate (4-1) for Touch use. This example would be suitable, among others, for use with a one-conductor multiplexor-based system that responds (because of its own inherent port leakage) to the inherent capacitance of the conductor when sampled at a given frequency and sample-duration, a commonly used approach to touch-keys that requires little external circuitry. The preferred embodiments of the invention envision the principles of this type of keypad, which as represented requires a zero-effort contact for Touch purposes but a significant effort to Press. The exact mechanical effort required can be tailored by altering the semi-conical geometry of the flexible contact cup.

Figure 5:
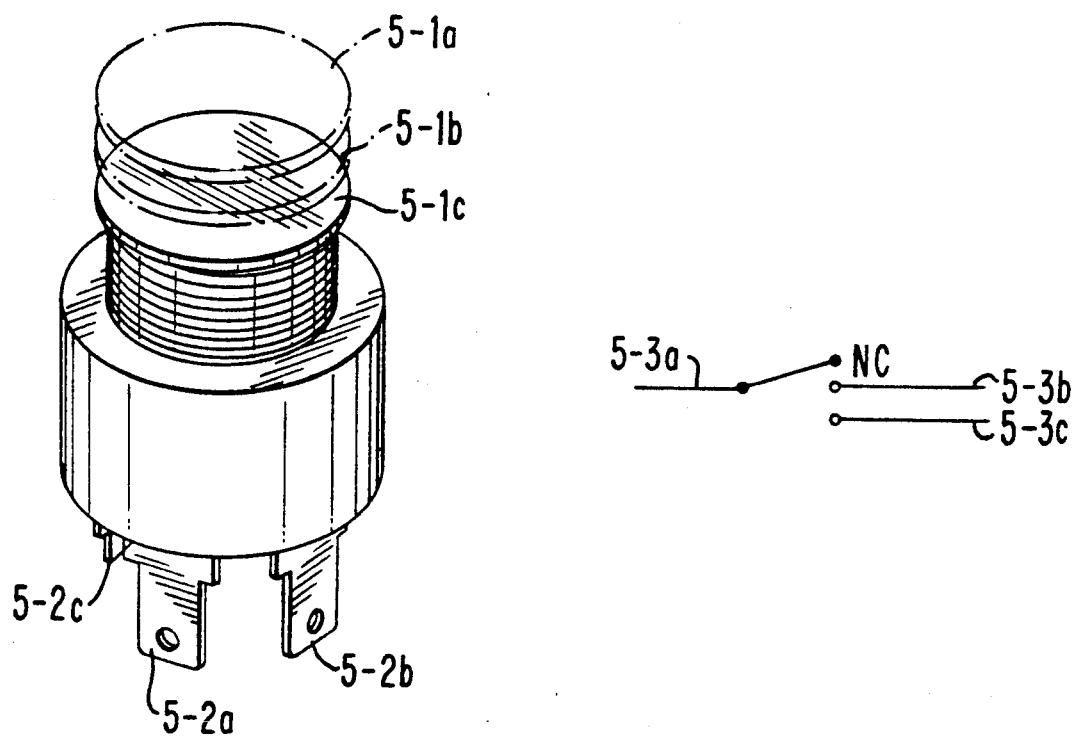
FIG. 5 is a drawing and schematic representation of a dual-throw detente pushbutton switch with the first position requiring less effort than the second.

FIG. 5 is a drawing and schematic representation of a dual-throw OFF-MOM-MOM pushbutton switch with the first throw position 5-1b (which would serve the Touch purposes of the invention) requiring less mechanical throw (and therefore less total throw effort) than the second throw position 5-1c (which would serve the Press functions). The bottom of throw 1 would typically have a resistance type linear-detente well-known to the state of the art, used to define the actuation depth of throw 1 for the user, forced past which throw 2 would make contact. The switch could alternately be configured as an OFF-MOM1-MOM1+2 to avoid make-break-make signal conditions. For a keypad with few keys this type of switch would suffice well, but it might be an unwieldy and costly approach for more multi-key or space-critical applications, since it is larger and mechanically more complex than a typical molded or laminated unit.

Figure 6:
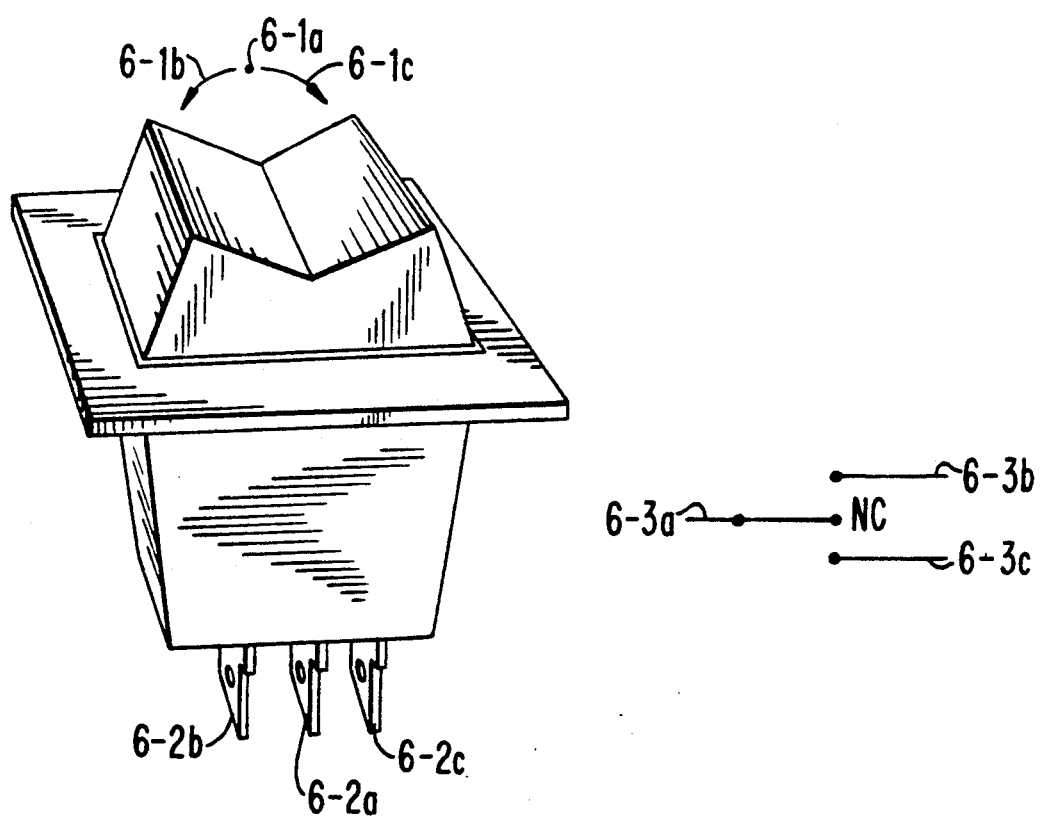
FIG. 6 is a drawing and schematic representation of a two-position rocker type switch suitable for use as a combined Press Key/Satellite Key.

FIG. 6 is a representative diagram of a two-position rocker type switch suitable for use as a combined Press Key/Satellite Key. Thrown in one direction the switch would serve the Touch purposes of the invention, while the other throw would serve the Press functions. In essence, for purposes of the invention this type of switch takes a "geographic" or "horizontally associated" approach to what the keys in FIGS. 4 and 5 do in a "stacked" or "vertically associated" fashion. This is a useable approach like the dual-throw pushbutton in FIG. 5, but might likewise prove unwieldy, costly, or space-inefficient for multi-key applications, since it is likewise larger and more mechanically complex than a typical molded or laminated unit.

Figure 7:
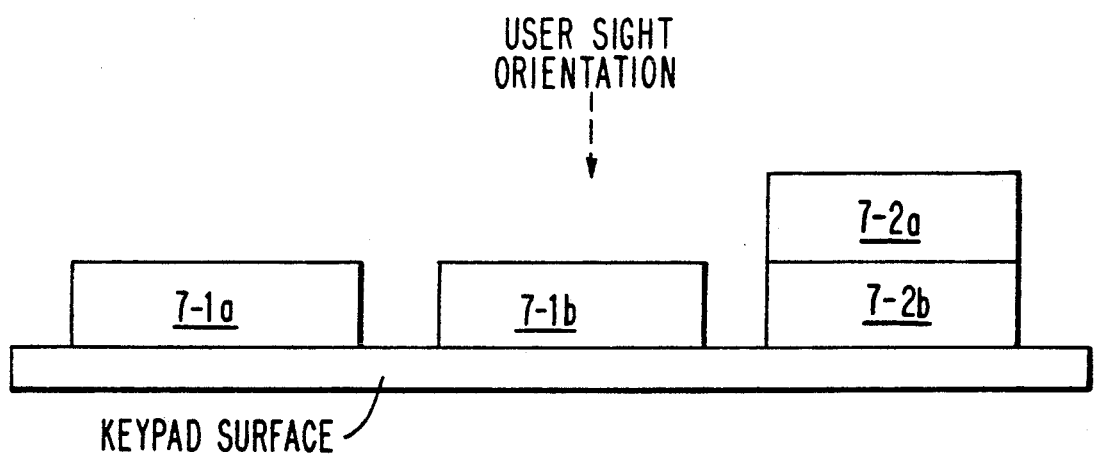
FIG. 7 is a block side-view representation of two horizontally associated key contacts and two vertically associated key contacts on a planar surface.

FIG. 7 is a block side-view representation of two horizontally associated key contacts (7-1a and 7-1b) and two vertically associated key contacts (7-2a and 7-2b) on a planar surface, substantially indicating the difference between such associations. A user, in other words, would perceive 7-1a as adjacent (side-by-side) to 7-1b, and 7-2a as above (on-top-of) 7-2b. It can readily be seen that the user will perceive the latter as a single key, even though two separate contacts are involved. In this illustration, 7-2a would have a lesser (or contact or proximity) actuation pressure and provide information, while 7-2b would require a greater (or substantially existent) actuation pressure and would provide ordinary function. Note that without this differential actuation (i.e., if 7-2a and 7-2b had substantially the same actuation characteristics) the 7-2a/7-2b pair would essentially be nothing more than a single-throw double-pole (SPDT) switch. The superiority of a differential actuation with a functional association, however-encompassing the preferred embodiment of the invention-can readily be seen. If no tactile or geographic cue is provided to indicate to the user which of 7-1a and 7-1b provides each service, even the closest of proximal associations will not allow for pre-identification for blind keying. Such an arrangement (all else being equal) will also take up at least twice the planar area, while the extra vertical (height) differential required by 7-2a/7-2b could be negligible, using, for example, only a thin conductive film.

FIG. 8 is an example representation of a store & forward telephone keypad & dialer with voice-synthesis key identification, capable of utilizing either a Dual-Press Protocol or a Hold-Down protocol for Touch detection with a single key bus. As described elsewhere (and referring also to FIG. 2), these less preferred embodiments use timing (Hold-Down) or keypress counting (Dual Press) to discriminate between a Touch and a Press rather than separate Touch/Press contacts and buses. Note, however, that there is a single bus (8-2) only between the keypad (8-1) and the timing or keypress-counting means (8-8), since these means control the enabling flow to the Dialing (ordinary function) means (8-6 and 8-7) or the Voice-synthesizer (information) means (8-4) according to their own respective time associated or count associated parameters. Beyond this point, the system is functionally identical and equivalent to one using the preferred vertically associated embodiments, and one can easily visualize blocks 3-8 and 8-8 as constituting a transparent, time-associated bus linked to the keypad.

FORMAT OUTLINE

In order to present a clearer understanding of the specification, the following format will be used.

The implementation of the teachings of the invention will be described in connection with various device and keypad types.

At the outset we will set forth examples of some various types of information which might be generically conveyed to a user of a device incorporating the invention. We will then set forth, by way of example only, some combinations of sub-systems which might be used to implement the invention, and some exemplary embodiments in which these subsystems might be reasonably married and applied to accomplish the teachings of the invention. Finally, by way of example only, we will list and briefly discuss some common devices to which the invention might be beneficially applied.

INFORMATION TYPES

Identification Information

This is the primary and most useful sort of information with regard to the invention, since the differential key-actuation pressure under the teachings of the preferred embodiments allow quite literally for perfectly accurate "blind" keying, so long as some sort of non-visual identifying information is provided by a Touch. There are limitless types of keys with various functions which might provide apt illustration of the informational concepts of the invention, but perhaps the best and simplest is the familiar, 12-key numeric telephone keypad. Therein the invention would most likely serve to audibly pre-identify the key occupied by the user's finger prior to dialing of the digit. Thus, putting one's finger upon the "*" key without applying pressure (touching it) would result in an audible voice message saying "star," or putting it similarly on the "1" key would result in the message "one." If one simply thereafter pressed the "1" key (with one's finger already on it, having been informed), one would hear a DTMF signal or pulse-train go out onto the telephone line, accomplishing the ordinary function of the key (dialing "1" to the line) and also confirming that the ordinary function had been invoked. This is a simple form of an identification-only system that could be easily implemented according to the precepts of the invention.

Functional Help Information

Expanding upon the above example, one could likewise provide help to a user regarding the functionality of the key. Instead of simply identifying the key (e.g., saying "one"), the device might further say: "One. The one key will dial the digit one onto the telephone line." This provides the user with a description of the purpose of the key, rather than simply identifying it.

Usage Help Information

Again including the above examples, the same key might be made to say: "One. To dial a one onto the telephone line, press this key hard." This includes the identification and functionality information above, and further adds usage or "how-to" information regarding the key. This information, along with functional help, would be of significant assistance in complex key systems such as computer keypads or industrial controller keypads, wherein the functions and uses of individual keys are often not obvious and where it is likewise often difficult to make key functions "faceplate explanatory."

Objective Use Information

Expanding further, the same key might be made to say: "One. To dial a one onto the telephone line, press this key hard. Dialing this digit first will access your long-distance carrier." This includes all the preceding information, and further adds objective or "why-to" information regarding the key. This sort of information would be extremely useful in systems such as elevator keypads, wherein the contents of the floors of the building may not be obvious. In a department store, for instance, one might touch the "Floor 1" key and be given information about what is on Floor 1, e.g., "Floor 1. Lingerie, women's-wear, housewares." One could then Press the Floor 1 key to go there, or try Touching others to pre-locate other departments before Pressing the one desired. Another example of this would be objective confirmation of previously entered information, such as a telephone "memory" key configured to announce its "remembered" phone number on a touch without actually dialing or "recalling" it until it was pressed.

Informational Objectives

All of the above examples deal with a basic precept of the invention, which is to provide information about a particular key or group of keys prior to functional use or execution, the most basic and useful being simple identification. Many extant systems use and have used voice, visual display, and other feedback means during and/or post-usage, but such information (other than as a confirmation that the key's ordinary function has been actuated or accomplished) is of limited utility. To use the above elevator example, pressing the "Floor 1" key and being told, "Floor 1. Lingerie, women's-wear, housewares," while the elevator is descending is not useful if one wanted to go, say, to the Hardware department on Floor 3.

INFORMATIONAL SUBSYSTEMS

Any or all of the information discussed above could as easily be conveyed visually on a screen, and even (in either form) invoked selectively through a sub-menu invoked by the informational actuation. Other alternatives could also be used for specialized purposes, an example of which might be dynamic tactile feedback for the blind and deaf (e.g., the "1" key responding with one mechanically palpable motion or "bump" when touched, and the "2" key responding with two similar "bumps", etc.) Flashing lights could be used similarly (although the utility of doing so is more problematic), or any conventional or unconventional means which passes specific key-related information to the user.

Voice-using and display-using implementations would, however, be the most useful forms in most instances, the latter being of great benefit in devices wherein keys have complex or un-obvious functions requiring long-winded explanations, and the former being especially beneficial to the handicapped and in instances like cellular telephones wherein accurate "blind" keying is desirable because visual distraction of the user presents hazards. Many such systems, especially those conveying usage or functionality information for training or educational purposes, or those in which the invention might have limited utility to some users (e.g., a sighted person using a phone for the blind) would probably incorporate off- and/or limiting-switches to disable all or part of the invention's functions.

Various types of hardware are available for fulfilling any of the above requirements:

Voice: The archetypical modern implementation of this requires only a voice-capable IC hooked up to an audio speaker. Many such IC's and types of speakers are available, and some IC's include the subsidiary amplifier hardware necessary to drive a speaker directly. The data patterns to provide the selected words, sounds, or phonemes are often incorporated (or pre-incorporated in a manufacturer-determined format) into such IC's as a masked on-board ROM, but can also be suitably implemented using external memory components such as ROMs, PROMs or EPROMs according to the specific IC used. Many such IC's are software or firmware programmable microprocessors which could also handle keypad data acquisition and translation, as well as many other specific tasks required by particular devices. Random-access data devices such as floppy- or hard-disks could also be used to store the necessary voice data digitally, or CD-disk systems could be employed for directly producing sounds and bypassing any on-board digital-translation steps, but random-access disks of any type could be gainfully used for very complex informational tasks or those requiring frequent changes. Even audio tapes could be employed, directly or as data-storage devices. It is also worthy of note that any such system could be made user-customizeable or configurable by including recording means as part of the hardware, allowing a user to change or tailor the informational messages according to his own needs.

Sound: In specialized applications wherein audible tones might be employed without resorting to speech, a plethora of buzzers, beepers, squawkers, tone generators and the like are available for various sounds and various purposes. Possible implementations might involve, for example, a beeper sounding a number of times indicative of the identity of the associated key (e.g., a key marked "3" could be identified by 3 short beeps), or a linear keypad might make an ascending/descending tone as one Touched the keys from left-to-right/right-to-left. In any case, such means might be easily and gainfully employed in addition to voice or display means as confirmation or warning devices, supplementing the primary Touch information in a variety of ways.

Visual: Generically we will use this term to mean the display of pictorial or alphanumeric data in a visual format, although many means for producing such are available. The simplest forms could be as rudimentary as a flashing, colored, or multi-colored light (similar to a sound-based implementation, see above), or an associated pre-printed transparency backlit only when the Touch key is invoked. For purely alphanumeric purposes, many types of traditional, segmented LED, VFD and LCD displays are available, as well as more exotic technologies for specific purposes. For more versatile (possibly pictorial) applications, a variety of pixel-matrix devices could be used, such as LCD or RGB matrix displays. It should be noted that specialized versions of the former can already be obtained for so-called "touch-screen" purposes, wherein a fixed or programmable key matrix is embedded transparently in or under the display screen. A Satellite Key, Dual-Press, or Press-and-Hold structure of the invention could be implemented using standard "touch-screen" technology, and a custom dual-level laminate with different actuation pressures could presently be used to implement the more preferred, vertically associated embodiments.

Tactile: Although the applications for this are limited (particularly to devices for the blind), many inexpensive piezo-mechanical devices are becoming available which could make a "pulse-count" tactile-feedback system practical for the purposes of the invention. Numerous temperature- and light-sensitive materials are also becoming available which change their shape or texture in response to stimulus, and which might be employed in a braille or braille-like fashion to provide more complex tactile information. A changeable "braille display" could also be conceived for use in conjunction with the operation of the invention for presenting detailed information in a purely tactile format, as for the blind and deaf.

TOUCH/PRESS KEYPAD SUBSYSTEMS

The preferred embodiment of the invention envisions what appears to the user as a single key, performing an informational function when contacted superficially and a traditional function-execution when actuated with significant finger pressure. Many hardware means could be used to effect such a system, which merely requires the superimposition of a keypad requiring no, little, or less pressure or proximity (typically contact-, proximity- or minimal-pressure-sensing) over the top of a keypad requiring some, more, or greater pressure or proximity (typically a traditional significant-pressure keypad). Both types are well known to the state of the art and have many variations, and since the concept of traditional, mechanical-pressure pushbuttons is so old and well-known as to have had its origins largely lost to history, we will not treat it here. Likewise, the concept of a minimal-pressure switch is only a technological extrapolation of a significant-pressure switch, and it can be readily seen that the former could be combined amiably with the latter. This could be approached technologically through the use of high-tech piezo-electrical components sensitive to exquisitely small pressures (also worth noting because of a lack of moving parts and because some can respond potentiometrically to mechanical stress), but the larger concept of pressure-actuated switching is still both traditional and obvious. True contact- and proximity-sensitive switches, however, are historically and technologically a more recent conceptual innovation which we will briefly exemplify:

Contact-Sensitive Switches: These types of keys are typically conductive, using the resistance, impedance, or capacitance changes caused in an exposed conductor by the contact of a finger to detect its presence. Typically they will detect an appropriate contacting surface with substantially zero pressure applied, and most are entirely insensitive to pressures above those necessary for minimal contact. Many types are well known, with the archetype perhaps being a multiplexor IC whose inherent port-leakage can be used at a specific frequency to charge a single-line conductor, which is then grounded by a touch. A less common (although still widely-used) approach is to detect contact through the electrical changes in a thermal-electric component caused by body heat.

Proximity-Sensitive Switches: These types of keys are typified by infra-red-sensitive keypads, which either passively detect the proximity of the infra-red component of body-heat, or actively generate infra-red frequencies and specifically detect occulations or reflections of their own signal. Other types of the latter could be conceived, since active-component systems can generate any sort of detectable emission for themselves-RF, for instance, or visible light or ultrasound-but infra-red types are the only ones now in common use for keypad applications.

EXEMPLARY EMBODIMENTS

The preferred embodiment of the invention envisions what appears to the user as a single key for both informational and functional purposes, performing its informational function when contacted superficially and executing its normal function when actuated with significant finger pressure. As described above, this merely requires the superimposition of a keypad requiring no, little, or less pressure or proximity over the top of a keypad requiring some, more, or greater pressure or proximity, with the latter being actuated to perform whatever ordinary functional task is required by the user according to the device, and the former performing informationally regarding the use of that key, using whatever informational means is appropriate to the design of the device. Most of these embodiments are obvious in light of the invention's objectives, e.g., a conductive-capacitive contact-sensing pad laminated onto the surface of a pressure-activated key. Other, less obvious embodiments are possible technologically, such as a zero-pressure contact key above a minimal-pressure one, or even a completely "touchless" key operating according to a further proximity and a nearer one. The principle of a lighter-effort key functioning informationally layered vertically above a heavier-effort key functioning executionally remains the same.

There are, however, other embodiments which are both possible and practical by which the precept of supplying key-associated information prior to a function-executing keypress may be met. A few are listed below for example:

Press-and-Hold: This sort of embodiment is timing-dependent, and therefore requires only a one-contact key of any sort. The user would actuate it appropriately and hold it while the informational function was displayed or played-out, at the end of which he could either release the key (without yet having actuated its ordinary function) or continue to hold it down until the ordinary function was actuated, perhaps further indicated by a beep or other acknowledgement as determined by the designer.

Dual-Press: This type of embodiment is not necessarily timing-dependent, although practical implementations probably would be. Like the Press-and-Hold embodiment above, it likewise requires only a single-contact key, since its basis is a reliance on counting keypresses, with a first or initial press serving informationally and a second or subsequent press of the same key serving functionally. Multi-press protocols serving the purposes of the invention could likewise be devised for specific uses and devices.

Satellite Key: This type of embodiment is basically a horizontal (and less convenient) extrapolation of the dual functionality of keys according to the invention. Instead of combining the ordinary and informational functions in a laminated or vertical format, a Satellite Key structure would actually use two keys or contacts horizontally related to one another; one providing execution and the other the related information. Although this represents a possibly less-obvious association of two separate keys, less clumsy implementations can be envisioned, using, for instance, a well-known MOM-OFF-MOM or MOM-NONE-MOM rocker switch to provide the key's ordinary function when thrown in one direction and its informational function when thrown in the other. Albeit less straightforwardly, this use of two horizontally associated contacts in a single switch could allow consistent (e.g., all keys right-throw for information and left-throw for ordinary function) pre-identification of a key just as in the preferred embodiment, allowing a user to actuate either information or ordinary function without removing his finger from the key.

Stand-alones and Overlays: Since the primary concern of the instant invention is as an informational adjunct to a more traditional keypad, it is obvious that means could be devised for adding such informational capability to existing devices not so equipped. It would easily be possible, for instance, to retro-equip a flat, pressure-sensitive membrane keypad (such as those common on microwave ovens well-known in the state of the art) with a suitable touch-sensitive overlay equipped with its own self-contained informational means. Likewise, with the advent of microminiaturized piezo sound circuits (such as those used in "talking" greeting cards also well-known in the state of the art), it would be possible to make miniature, self-contained, touch-sensitive informational devices which could be post-applied to existing, separate keys, individually giving each such key the function of the invention. Such devices of any sort could contain any desired information, either particular to the device being enhanced, or for more general application (e.g., standard sets of numbers one-through-ten or zero-through-nine). Such devices could even be made to record user-decided messages into a RAM or PROM at the time of installation, making them highly versatile. With the present state of miniaturization of voice-capable memory, microcircuitry, and power supply systems (possibly including, for example, photo-voltaics where long life is desired), there are no major technological obstacles to such self-contained stand-alones and overlays.

PRACTICAL APPLICATIONS

It is obvious in light of the above that the instant invention has a broad range of potential applications in common use. For the sake of example, we will discuss several of the more obvious ones here:

Telephones: Any device with a basically numeric keypad would be an obvious candidate for enhancement with the invention (e.g., pocket or desktop calculators; microwave ovens and other home appliances; TV's VCR's, Stereos or Video Games with digitally-controlled tuning or functions; or remote controls for these and other common digitally-controlled devices) but none is more ubiquitous than the telephone and its familiar dozen keys. The benefits to the visually imparied should be obvious (and this might well include sighted people in a power blackout), but the most compelling application is in mobile use. Cellular-phone safety is currently being addressed in many ways—often propelled by a legislative push in the back—and most of the issues of talking while driving have been adequately addressed by the new generation of hands-free phones. These phones are typically only hands-free for conversation, however, with dialing remaining another matter, and with the split-attention problems involved only being compounded by the need for compactness in cellular keypads.

This aspect of the cellular-safety problem has been redressed only badly by the current generation of phones, and the necessity of removing one's concentration-if not one's eyes-from the road continues to be a problem. The only broad and current alternative to keypad dialing, voice-recognition, is still quite costly and suffers from enormous unreliability problems due to the constantly shifting ambient-noise characteristics of the mobile environment, requiring extensive and expensive (and often futile anyway) filtering systems. These systems also often require "training" for a particular user's voice, making them susceptible to vagaries (like headcolds) in the user's voice pattern, and are awkward to use in any case, having specialized protocols lacking the familiar, self-explanatory characteristics of a standard phone keypad. Most also do not allow full voice access to many of the useful special features of the base telephone unit, such as auto-redialers and repertory memories. The invention therefore represents a viable, less expensive, and far less frustrating alternative to such marginally-useable systems, still requiring one hand of a driver, but audibly allowing him to quickly and accurately "blind-key" a number without removing his eyes from the road, and similarly not taxing his concentration to recall the rules of voice-recognition "phone-speak." With proper treatment, the invention could likewise identify and describe all the keys on the pad, allowing the user full and equally "blind" access to rapid-dialing and convenience features.

Finally, it should be noted in the latter regard that single-key telephone memories make an excellent example of how a non-prerecorded informational announcement might be used. With an on-board RAM or EEPROM and recording means to support it, a memory key might be programmed with both a number and a corresponding name. Thus, if "Memory 1" was programmed to dial Herb's number, the corresponding informational means would similarly be programmed to announce "Herb" rather than "Memory one" when Touched.

Elevators: As previously noted, a department-store elevator is an excellent example of how the invention might be used to give Touch information regarding the objective of a corresponding Press. This would more likely be implemented visually than audibly, since a great many people would use such an elevator, but with some sort of graphics capability such a display might easily depict not only the departments on the Touched floor, but also an overview of the floor itself, allowing users to quickly reference the exact location of any given department. An audible identification might also be included for visually-handicapped users unable to use the graphic data (a feature that would certainly apply to elevator keypads in any sort of building, or indeed any sort of keypad intended for public access, such as automated teller machines or (again) public telephones).

Home Appliances: The ubiquitous VCR that "only my kid can program" is an excellent example of a keypad system whose use might be enhanced and simplified by some on-the-keypad functional and usage information. This could be audible, or, since most modern units do their programming on-screen, could as easily be designed to use the television itself as the informational display. Such functions could also be applied to any of the raft of household devices which are drifting from analog knobs and dials to a keypad format, such as microwave ovens, dishwashers, and washers and driers. Again, the handicapped could also benefit from such incorporation, which could even be made available by manufacturers as an add-on overlay fitting existing keypad products.

Industrial Consoles: Many companies and industries make use of complex custom and semi-custom keypads for tasks ranging from design to process-control. Such systems are often complex and not functionally obvious, and in the worst cases the misuse of a single key might bring down an entire system or production line. Training employees to use such systems can be arduous as well, and the invention might be beneficially employed both to reduce this and manage the overwhelming "VCR-syndrome" complexity of the most complicated systems. Again, there are also many industrial applications wherein handicapped workers might benefit significantly from devices equipped with the invention.

Computers: The benefits of the invention for most computer users are neither great nor obvious, but the benefits for neophyte users (especially the very young) might be significant, and for visually handicapped users would be clear and manifold. Again, the invention could be applied easily in an overlay form to most PC's and common consoles, especially in a purely identificational form. Since form-fitting rubber dust covers which do not require removal are already available for most common layouts, the extrapolation to a conductive-rubber "talking-dust-cover" would be a short and happy one for the blind, especially since the data processing community is one of a very few high-paying areas where the handicapped in general have made significant employment inroads. Such specialty items could even be designed to interface with the main processor, and with appropriately sophisticated software might make even the complexities of rapid and accurate word-processing or spreadsheet use an attainable goal.

Likewise, the benefits of the invention might well be applied to most of the specialty computers, "how-to" software, and computer keyboards designed for the education of small children. Typing-tutor applications are one widespread and obvious possibility.

One skilled in the art will immediately understand that there are many, probably thousands, of ways in which the teachings of this invention could be implemented in various devices with various aims. All such ways are deemed to be within the spirit and scope of the claims appended to this specification.

I claim:

1. A system operable from at least one inputted signal, comprising at least one switching means having first and second states, said first state being the default state while said second state being a partial requirement for producing a predetermined signal, said at least one switching means responsive to manual contact for changing its state from said first state to said second state for producing said predetermined signal regardless of the duration of the period of time in said second state after being in said second state continuously for at least a predetermined period of time, pre-identification means coupled to said at least one switching means and operable for producing a pre-identification signal when the state of said at least one switching means has been changed from said first state to said second state, said pre-identification signal identifying said predetermined signal to an operator, signal generating means operatively coupled to said at least one switching means for generating said predetermined signal after said at least one switching means has been maintained in said second state for said predetermined period of time, and timing means operatively coupled to said at least one switching means for generating a timing signal for measuring a time period from when said at least one switching means is changed from its first state to its second state, whereby, said at least one switching means initially informs an operator as to the predetermined signal and thereafter, produces its predetermined signal if it is maintained in its second state throughout the predetermined time period as measured by said timing means regardless of any additional time said second state is maintained.

2. The system as claimed in claim 1, further comprising indicating means operable for indicating that said at least one switching means has been maintained in said second state for the predetermined time.

3. The system as claimed in claim 1, wherein said pre-identification means generates an audible indication of said predetermined signal.

4. The system as claimed in claim 1, wherein said pre-identification means generates a visual indication of said predetermined signal.

5. The system as claimed in claim 1, wherein said at least one switching means includes a mechanical switch for changing between the states of said switching means.

6. The system as claimed in claim 5, wherein said mechanical switch has a single contact pair.

7. The system as claimed in claim 1, wherein there are a plurality of switching means, each switching means having an associated predetermined signal, an associated predetermined time period and an associated pre-identification means.

8. A system operable from at least one inputted signal, comprising at least one switching means including first inputting means having first and second states and second inputting means having first and second states, the first state of said first inputting means being a default state, said first inputting means being responsive to manual contact for changing its state from said first state to said second state, the first state of said second inputting means being a default state and the second state of said second inputting means being operable for producing a predetermined signal, said second inputting means responsive to manual contact for changing its state from said first state to said second state, pre-identification means coupled to said at least one switching means and operable for producing a pre-identification signal when the state of said first inputting means has been changed from its first state to its second state, and signal generating means operatively coupled to said at least one switching means for generating said predetermined signal when said second inputting means is changed from its first state to its second state, said second inputting means being operable independent of said first inputting means so that said second inputting means can be used to generate said predetermined signal without a pre-identification signal being produced first, whereby an operator can first change the state of said first inputting means to its second state, learn from said pre-identification means the associated predetermined signal, and thereafter, change the state of said second inputting means from its first state to its second state to produce said predetermined signal or alternately, the operator can change the state of only the second inputting means to its second state to produce said predetermined signal.

9. The system as claimed in claim 8, wherein said pre-identification means generates an audible indication of said predetermined signal.

10. The system as claimed in claim 8, wherein said pre-identification means generates a visual indication of said predetermined signal.

11. The system as claimed in claim 8, wherein said first and second inputting means are positioned adjacent each other.

12. The system as claimed in claim 8, wherein said at least one switching means is in the form of a split dual section membrane type switch.

13. The system as claimed in claim 8, wherein said first and second inputting means are combined into a single mechanical switch.

14. The system as claimed in claim 8, wherein there are a plurality of switching means, each switching means having an associated predetermined signal, and an associated pre-identification means.

15. A method of operating a system comprising at least one switching means having first and second states, said first state being the default state while said second state being a partial requirement for producing a predetermined signal, said at least one switching means responsive to manual contact for changing its state from said first state to said second state for producing said predetermined signal regardless of the duration of the period of time in said second state after being in said second state continuously for at least a predetermined period of time, said method comprising changing said switching at least one means from its first state to its second state, generating a pre-identification signal when the state of said at least one switching means has been changed from said first state to said second state, said pre-identification signal identifying said predetermined signal to an operator, and generating said predetermined signal only after said at least one switching means has been maintained in its second state a predetermined period of time, whereby, a single change in the state of said at least one switching means initially enables the operator to identify the associated predetermined signal and maintaining the change in state for at least the predetermined period of time generates said predetermined signal.

16. The method as claimed in claim 15, further comprising the step of indicating that said switching means has been maintained in said second state for the predetermined time.

17. The method as claimed in claim 15, wherein said pre-identification signal generates an audible indication of said predetermined signal.

18. The method as claimed in claim 15, wherein said pre-identification signal generates a visual indication of said predetermined signal.

* * * * *